(12) United States Patent
Hoyte et al.

(10) Patent No.: US 9,995,119 B2
(45) Date of Patent: Jun. 12, 2018

(54) ELECTRIC SUBMERSIBLE PUMPING SYSTEM WITH PERMANENT MAGNET MOTOR

(71) Applicant: GE Oil & Gas ESP, Inc., Oklahoma City, OK (US)

(72) Inventors: Scott Hoyte, Oklahoma City, OK (US); Christopher Middleton, Oklahoma City, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 294 days.

(21) Appl. No.: 14/942,993

(22) Filed: Nov. 16, 2015

(65) Prior Publication Data
US 2017/0138159 A1 May 18, 2017

(51) Int. Cl.
  G05D 7/06 (2006.01)
  E21B 43/12 (2006.01)
  E21B 41/00 (2006.01)
  F04D 19/00 (2006.01)
  H02P 21/00 (2016.01)

(52) U.S. Cl.
  CPC ........ E21B 43/128 (2013.01); E21B 41/0092 (2013.01); F04D 19/00 (2013.01); G05D 7/0676 (2013.01); H02P 21/00 (2013.01)

(58) Field of Classification Search
  CPC .................................................. G05D 7/0676
  USPC .................................. 318/400.2, 400.1, 700
  See application file for complete search history.

(56) References Cited

U.S. PATENT DOCUMENTS

| 7,659,685 | B2 * | 2/2010 | Cesario | G05B 13/04 |
| | | | | 318/568.13 |
| 8,169,172 | B2 * | 5/2012 | Markunas | H02P 25/03 |
| | | | | 318/400.23 |
| 8,373,370 | B2 * | 2/2013 | Kwon | H02P 21/0017 |
| | | | | 318/400.01 |
| 2008/0067116 | A1 | 3/2008 | Anderson et al. | |

(Continued)

FOREIGN PATENT DOCUMENTS

| CN | 102005883 A | 4/2011 |
| EP | 3107204 A1 | 12/2016 |
| WO | 2015118678 A1 | 8/2015 |

OTHER PUBLICATIONS

Matsui et al., "High Precision Torque Control of Reluctance Motors", Industry Applications Society Annual Meeting, vol No. 1, pp. 538-543 on Oct. 1, 1989.

(Continued)

*Primary Examiner* — David S Luo
(74) *Attorney, Agent, or Firm* — Crowe & Dunlevy, P.C.

(57) ABSTRACT

A method of operating a pumping system includes an electric motor and a variable speed drive. The method includes the steps of setting a first preference for the operation of the motor, loading a first optimized motor model into the variable speed drive and controlling the motor in accordance with the first preference. The method continues with the steps of monitoring the performance of the motor and setting a second preference for the operation of the motor, wherein the second preference is different from the first preference. The method concludes with the steps of loading a second optimized motor model into the variable speed drive and controlling the motor in accordance with the second preference.

18 Claims, 4 Drawing Sheets

(56) References Cited

U.S. PATENT DOCUMENTS

2015/0270747 A1    9/2015   Toliyat et al.

OTHER PUBLICATIONS

PCT Search Report and Written Opinion issued in connection with corresponding PCT Application No. PCT/US2016/062257 dated Mar. 2, 2017.

* cited by examiner

ELECTRIC SUBMERSIBLE PUMPING SYSTEM WITH PERMANENT MAGNET MOTOR

FIELD OF THE INVENTION

This invention relates generally to the field of electric submersible pumping systems, and more particularly, but not by way of limitation, to an improved control system for electric submersible pumping systems that include a permanent magnet motor.

BACKGROUND

Pumping systems are often deployed into wells to recover petroleum fluids from subterranean reservoirs. Typically, the submersible pumping system includes a number of components, including one or more electric motors coupled to one or more high performance pumps. In the past, large induction motors have been used to drive the pump. The induction, or "squirrel cage," motors tend to be long. These long motors present deployment problems in certain applications, including deviated wellbores and surface applications with limited space.

The electric motor is often driven by a variable speed drive located on the surface. The variable speed drive produces an alternating current that is transferred to the electric motor through a power cable. In many modern pumping systems, the variable speed drive produces a low voltage, pulse width modulated (PWM) current at a selected frequency. The waveform produced by the variable speed drive can be adjusted manually or automatically to adjust the operating parameters of the pumping system. Step-up transformers can be used to modify the output of the variable speed drive to the design voltage range of the motor.

Recently, motor drives have been provided with have control features called "Field Oriented Control," or "Vector Control", that attempt to use the motor voltage and current information to identify motor rotor position. With this position information the drive can commutate the applied voltage in a way that yields better performance and a higher level of control than other open-loop drive techniques. In vector control schemes, the stator currents of the three-phase AC electric motor are identified as two orthogonal components that can be visualized with a vector. One component defines the magnetic flux of the motor (d), the other the torque (q). The control system of the drive calculates from the flux and torque references given by the drive's speed control the corresponding current component references. Vector control can be used to control AC synchronous and induction motors and can be used to operate a motor smoothly over the full speed range, generate full torque at zero speed, and have high dynamic performance including fast acceleration and deceleration.

Although effective, the vector control algorithms are based on calculations using a motor model that is established during manufacture, prior to operation. In applications where the load varies during the service life of the motor, the static vector control algorithm does not always obtain optimal performance from the motor. Additionally, the existing control algorithms are set during manufacture so that the motor operates at a relatively constant efficiency or power output. Once the efficiency of the motor has been established, the power output from the motor is increased by making the motor longer. The inability to adjust efficiency and power output in the field presents a significant drawback in existing systems. There is, therefore, a need for an improved motor control system that is well-suited for use with permanent magnet motors and that provides a greater range of operational characteristics in the field.

SUMMARY OF THE INVENTION

In an embodiment, the present invention includes a method of operating a pumping system that includes an electric motor and a variable speed drive. The method includes the steps of setting a first preference for the operation of the motor, loading a first optimized motor model into the variable speed drive and controlling the motor in accordance with the first preference. The method continues with the steps of monitoring the performance of the motor and setting a second preference for the operation of the motor, wherein the second preference is different from the first preference. The method concludes with the steps of loading a second optimized motor model into the variable speed drive and controlling the motor in accordance with the second preference.

In another embodiment, the present invention includes a method of operating a pumping system that includes an electric motor and a variable speed drive. The method include the steps of setting a first preference for the operation of the motor, loading a first optimized motor model into the variable speed drive, controlling the motor in accordance with the first preference and monitoring the performance of the motor by comprises monitoring the theta ratio of the motor under a torque load.

In another embodiment, the present invention includes an electric submersible pumping system that has a pump, a motor configured to drive the pump, wherein the motor is a permanent magnet motor, and a variable speed drive configure to control the operation of the motor, wherein the variable speed drive includes a field oriented control scheme.

DETAILED DESCRIPTION

Figure 1:
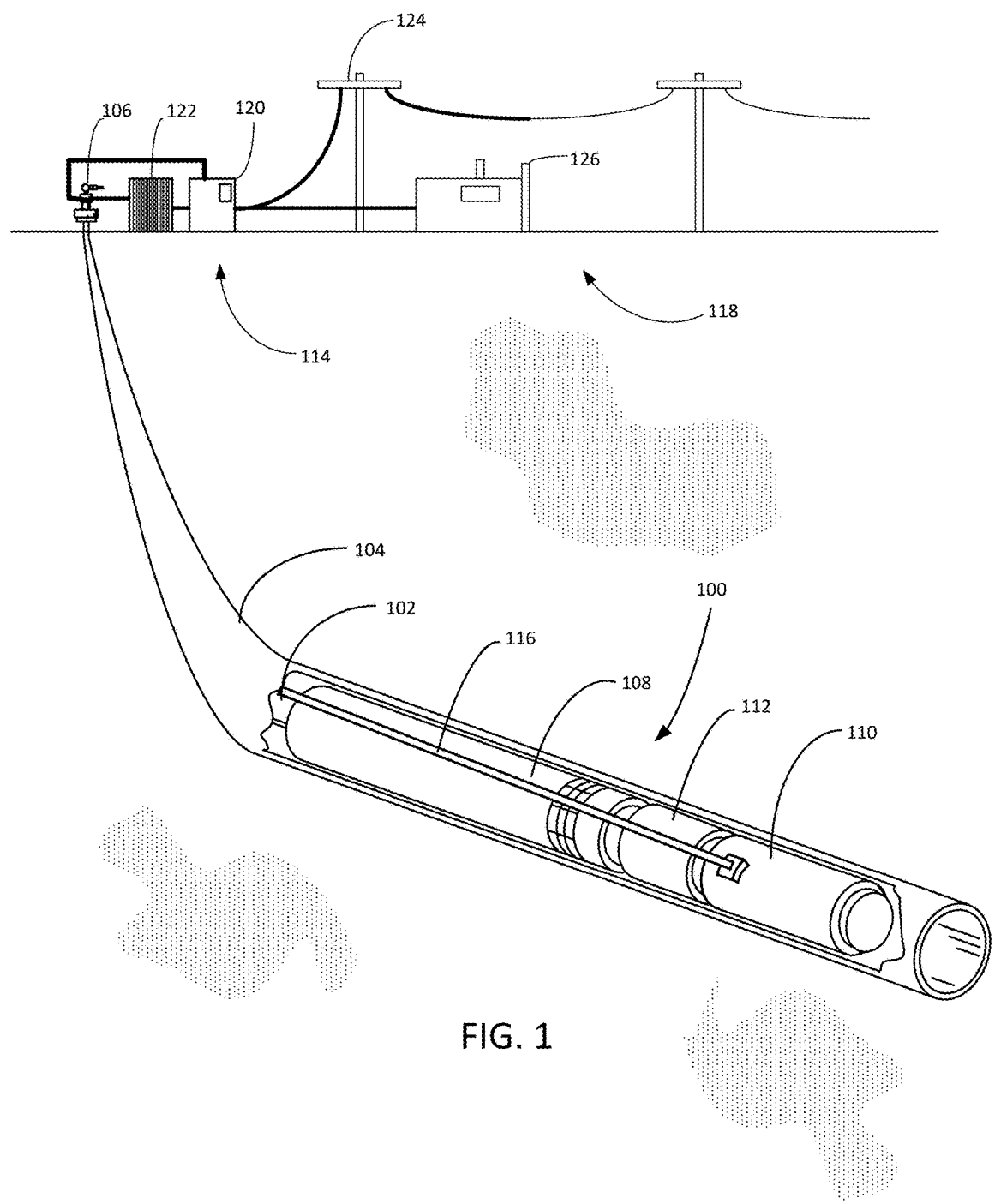
FIG. 1 is a perspective view of a pumping system constructed in accordance with an exemplary embodiment.

In accordance with exemplary embodiments of the present invention, FIG. 1 shows a perspective view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although the pumping system 100 of FIG. 1 is depicted in a deviated or non-vertical wellbore 104, the pumping system 100 and methods disclosed herein will find also utility in traditional vertical wellbores.

The pumping system 100 includes a pump 108, a motor 110 and a seal section 112. The motor 110 is an electric motor that receives power from surface facilities 114 through a power cable 116. When energized, the motor 110 drives a shaft (not shown) that causes the pump 108 to operate. The seal section 112 shields the motor 110 from mechanical thrust produced by the pump 108 and provides for the expansion of motor lubricants during operation. The seal section 112 also isolates the motor 110 from the wellbore fluids passing through the pump 108.

In exemplary embodiments, the motor 110 is a permanent magnet motor in which the rotor includes one or more permanent magnets. The permanent magnets within the rotor may be constructed of ferrite or rare earth magnetic materials. Suitable materials include neodymium and alloys of neodymium, iron and boron. The use of a permanent magnet motor creates a power dense motor 110 that can be made shorter than conventional induction motors. In other embodiments, however, the motor 110 is a squirrel cage, induction motor.

The surface facilities 114 provide power and control to the motor 110. The surface facilities 114 include a power source 118, a variable speed drive (VSD) 120 and a transformer 122. The power source 118 includes one or both of a public electric utility 124 and an independent electrical generator 126. Electricity is fed by the power source 118 to the variable speed drive 120.

Figure 2:
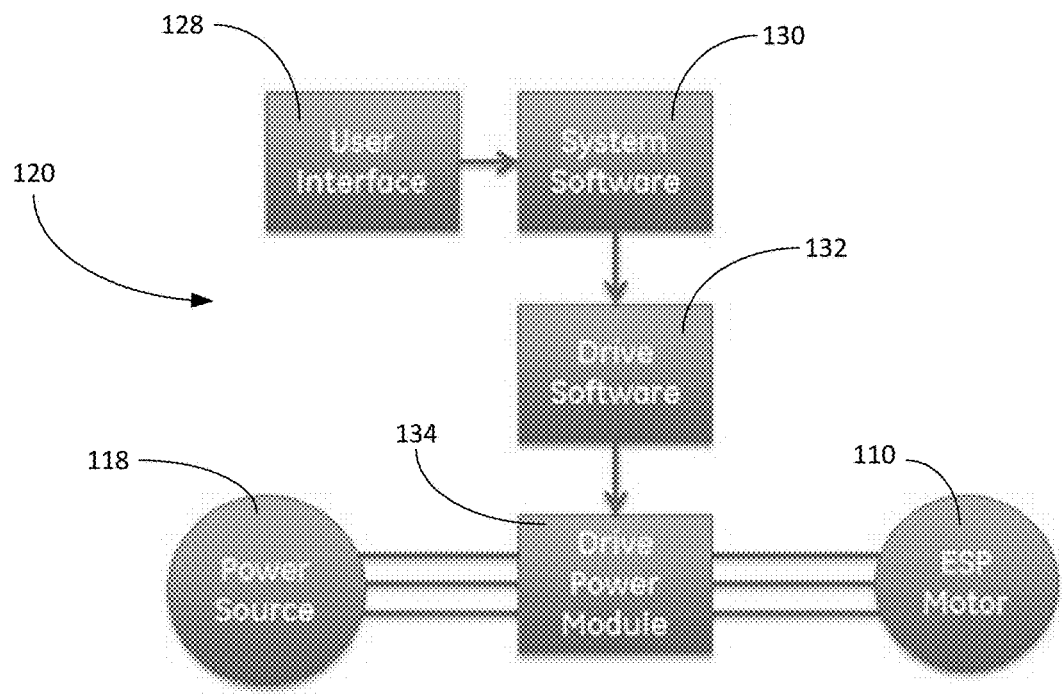
FIG. 2 is a functional block diagram of the motor control system of the pumping system of FIG. 1.

Turning to FIG. 2, the variable speed drive 120 includes a user interface 128, system software 130 and drive software 132 that cooperatively control the operation of the drive power module 134. The drive power module 134 receives input power from the power source 118. During normal operation, the drive power module 134 produces a low voltage, pulse width modulated (PWM) voltage at a selected frequency. The output of the drive power module 134 is provided to the motor 110. The waveform produced by the drive power module 134 can be adjusted manually or automatically through the user interface 128, system software 130 and drive software 132 to adjust the operating parameters of the motor 110. The combination of the user interface 128, system software 130, drive software 132 and drive power module 134 are collectively referred to as the motor control system 136.

Figure 3:
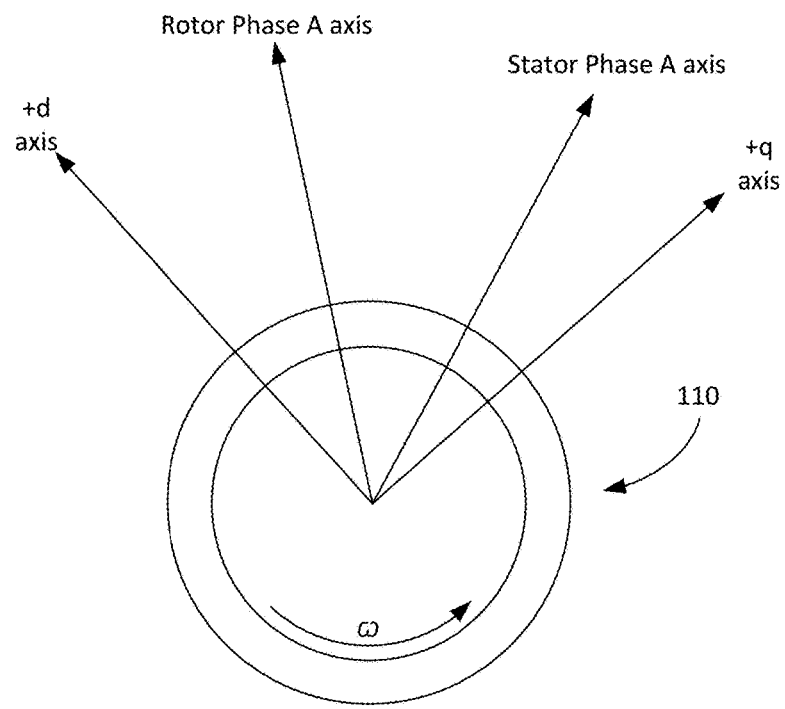
FIG. 3 is a functional depiction of the motor of FIG. 1 showing the direct (d) and quadrature (q) components of the current vector.

Turning to FIG. 3, shown therein is a graphical depiction of the rotation of the rotor at a speed "ω" of the motor 110 in a reference frame, showing the direct (d) and quadrature (q) components of the current vector. The motor 110 can be approximated using a complex stator current space vector defined in a (d,q) coordinate system with orthogonal components along the d and q axes. The field flux linkage component of current is aligned along the d axis and the torque component of current is aligned along the q axis. A significant benefit of the field oriented control (FOC), vector control (VC) functionality is the ability to largely decouple the attributes of speed and torque within the motor 110. The permanent magnet synchronous motor 110 with FOC/VC control is capable of full load torque at nearly any rotational speed.

Figure 4:
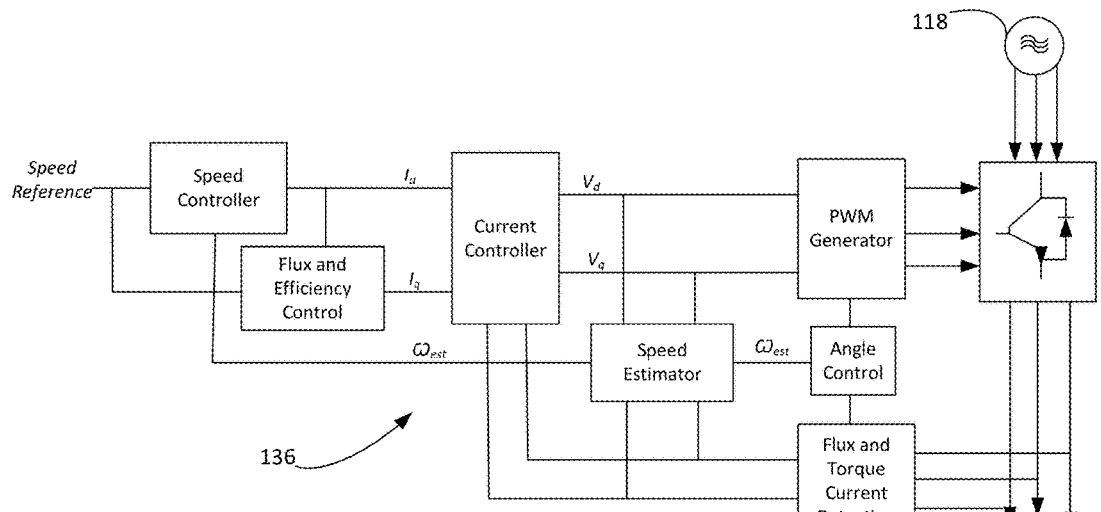
FIG. 4 is a functional block diagram of an exemplar vector control scheme employed by the motor control system of FIG. 2.

Turning to FIG. 4, shown therein is a functional block diagram of an exemplar vector control scheme employed within the motor control system 136. Generally, the motor control system 136 incorporates an iterative control scheme in which reference currents $I_d$ and $I_q$ are initially generated based on a "Speed Reference" input. The reference currents are provided to a current controller module, which outputs representative voltages, $V_d$ and $V_q$. The voltages are presented to the PWM generator, which produces a three-phase current to an inverter. Power is fed to the inverter from the power source 118. In response to the three-phase signals from the PWM generator, the inverter produces controlled, three-phase power to the motor 110.

The motor control system 136 monitors the power provided to the motor 110 and estimates rotor speed and position. The estimated rotational speed of the motor 110 is then provided back through the motor control system 136 and adjustments can be made to the output of the variable speed drive 120 to more closely approximate the Speed Reference input. It will be appreciated that the functional depiction of the motor control system 136 in FIG. 4 is merely exemplary and additional and alternative Field Oriented Control schemes are contemplated as within the scope of the present invention. It will be appreciated that the motor control system 136 can be embodied as control software within the system software 130, drive software 132 or drive power module 134.

Figure 5:
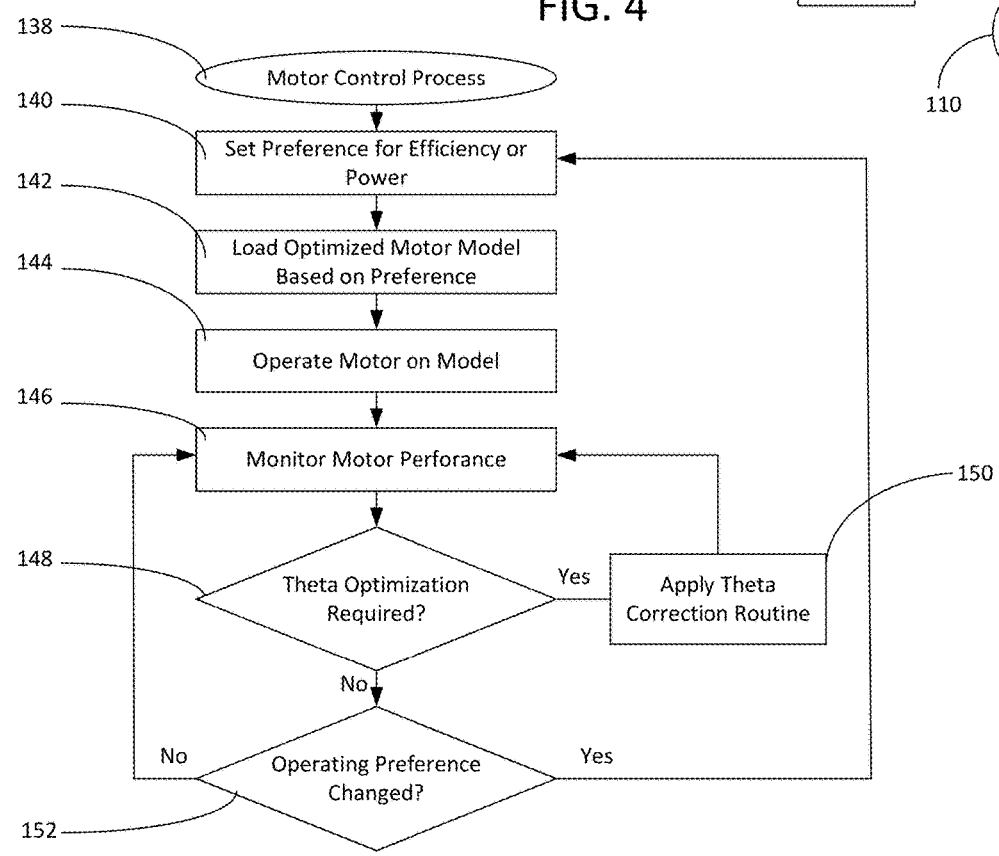
FIG. 5 is a process flow diagram for a motor control process.

Turning to FIG. 5, shown therein is a flow chart for a motor control process 138. The motor control process 138 generally permits the motor 110 to be controlled at various efficiencies and power ratings after the motor 110 has been placed into operation. This represents a significant improvement and departure from prior art designs in which the efficiency of the motor was fixed during the manufacturing process and adjustments to power output could only be made by changing the effective length of the motor.

The process 138 begins at step 140 when the operator inputs into the motor control system 136 a preference for increased efficiency, increased power output or a balanced performance from the motor 110. Based on this input, the motor control system 136 automatically loads a reference motor model at step 142 that is optimized for the operational criteria selected at step 136. Once the motor model has been loaded, the motor 110 can be operated at step 144 in accordance with the parameters associated with the loaded motor model.

At step 146, the operation of the motor 110 is monitored 146 on a continuous or periodic basis. Due to the widely varying operational demands on the motor 110, the assumptions initially used to produce the initial motor model may become inaccurate over time. In particular, the motor control system 136 monitors the torque load carried by the motor 110. For every torque load, there is an optimized ratio of the q-axis current ($I_q$) to the d-axis current ($I_d$). The ratio of these currents is referred to as "theta." As the torque load or other operational dynamics change, the theta ratio may become suboptimal.

At decision block 148, the motor control system 136 determines whether theta optimization is required. The decision to optimize the theta ratio arises and triggers an adjustment of the theta ratio at step 150 when the ratio falls outside a predetermined threshold variance from the optimal ratio for a given torque load. If the theta ratio remains within the threshold range, the motor control process 138 proceeds to step 152. If, on the other hand, the theta ratio falls outside the prescribed range, a theta correction routine is undertaken and applied.

Figure 6:
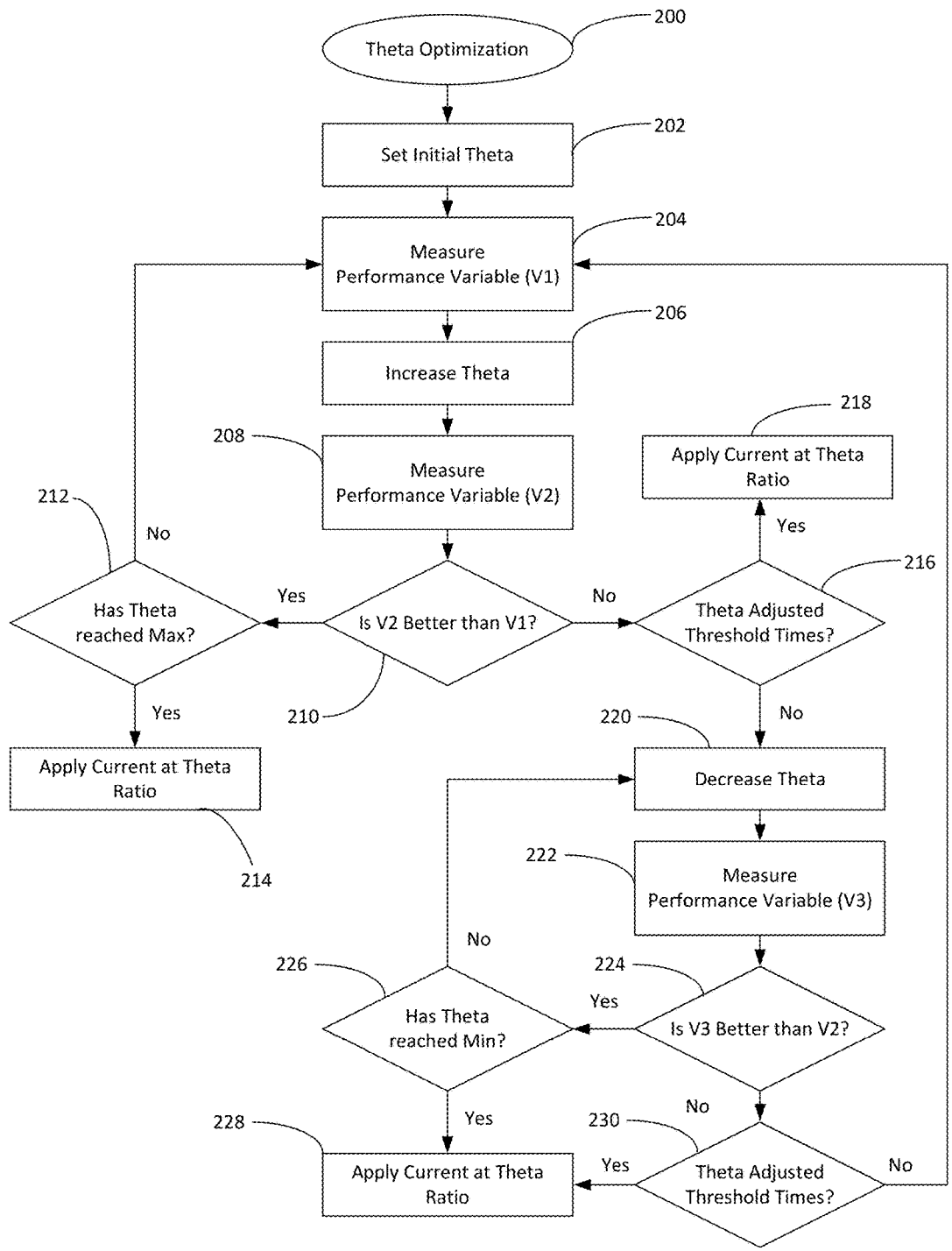
FIG. 6 is a process flow diagram for a method of optimizing the theta ratio of the quadrature (q) and direct (d) components of the current vector.

A suitable theta correction routine 200 is provided in FIG. 6. The theta correction routine 200 presented in FIG. 6 seeks to optimize the theta correlation between q-axis current ($I_q$) and the d-axis current ($I_d$), by increasing or decreasing one or both of the current vectors. It will be appreciated that additional and alternative theta correction routines 150 are contemplated as within the scope of the present invention.

At step 202, an initial theta value is determined and an initial performance variable (V1) is measured at step 204. The performance variable can be an actual or estimated value for an aspect of the operation of the motor 110. Performance variables (V) include rotational speed, average current draw, efficiency, power output, and power density. At step 206, the theta ratio is increased and at step 208 the performance variable is measured. The theta ratio is increased by manipulating one or both of the relative values of the q-axis current ($I_q$) and the d-axis current ($I_d$) vectors. At step 210, the motor control system 136 determines if the second measurement (V2) is better than the first measurement (V1). The evaluation of whether the performance variable improved will be based on the type of performance variable evaluated and the desired improvement in that variable.

If the second measurement reveals that the performance variable (V2) is better, the process moves to step 212 and a determination is made whether the theta ratio has reached a predetermined maximum value (e.g., 1). If so, the process moves to step 214 and the optimized theta ratio is used to drive the motor 110. If not, the process returns to step 204, the performance variable is measured and the theta ratio is incrementally increased.

If the iterative comparison of the performance variable indicates that the second measurement is not better than the first measurement at step 210, the process moves to decision block 216 and a determination is made whether the theta ratio has been adjusted a predetermined threshold number of times (e.g., 10). If the theta ratio has been adjusted at least the threshold number of times, the process moves to step 218 and the optimized theta ratio is used to drive the motor 110. If not, the process moves to step 220 and the theta ratio is decreased, again by manipulating one or both of the relative values of the q-axis current ($I_q$) and the d-axis current ($I_d$) vectors. At step 222, the performance variable is reevaluated and compared against the previous value. The evaluation of whether the performance variable improved will be based on the type of performance variable evaluated and the desired improvement in that variable.

If the comparison reveals that the performance variable is better, the process moves to step 226 and a determination is made whether the theta ratio has reached a predetermined minimum value (e.g., −1). If so, the process moves to step 228 and the optimized theta ratio is used to drive the motor 110. If not, the process returns to step 220 and the theta ratio is incrementally decreased.

If at step 224 the comparison determines that the performance variable has not improved, the process moves to decision block 230 and a determination is made whether the theta ratio has been adjusted a predetermined threshold number of times (e.g., 10). If the theta ratio has been adjusted the threshold number of times, the process moves to step 228 and the optimized theta ratio is used to drive the motor 110. If the theta ratio has not been adjusted the threshold number of times, the process returns to step 204 and the theta ratio is incrementally increased. It is contemplated that the theta optimization routine 200 will be performed on a scheduled, periodic basis during the operation of the motor 110. It will be appreciated that the theta optimization routine 200 is merely exemplary and additional or alternative optimization routines could also be employed.

Turning back to FIG. 5, if no theta optimization is required, the motor control process 138 proceeds to decision block 152 and the operator is afforded the opportunity to change the baseline efficiency and power output of the motor 110. If no change is required at step 152, the motor control process 138 returns to step 146 and the operation of the motor 110 and motor control system 136 is monitored. If a change in the overall operational characteristics of the motor 110 is desired, however, the motor control process 138 permits the adjustment of the power output and efficiency of the motor 110. The motor control process 138 returns to step 140 and the operator is prompted to enter a new preference for the efficiency and power output of the motor 110. Thus, the motor control system 136 and motor control process 138 permit the modification of operational control scheme for the motor 110 that does not require an adjustment to the physical components of the pumping system 100.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method of operating a pumping system that includes an electric motor and a variable speed drive, the method comprising the steps of:
   setting a first preference for the operation of the motor;
   loading a first optimized motor model into the variable speed drive;
   controlling the motor in accordance with the first preference;
   monitoring the performance of the motor;
   setting a second preference for the operation of the motor, wherein the second preference is different from the first preference;
   loading a second optimized motor model into the variable speed drive; and
   controlling the motor in accordance with the second preference.

2. The method of claim 1, wherein the step of controlling the motor in accordance with the first preference further comprises controlling the motor using a field oriented control scheme.

3. The method of claim 2, wherein the step of controlling the motor in accordance with the first preference further comprises controlling the motor using a vector control scheme.

4. The method of claim 3, wherein the step of monitoring the performance of the motor comprises monitoring the theta ratio of the motor at a given torque load.

5. The method of claim 4, further comprising a step of optimizing the performance of the motor by adjusting the theta ratio of the motor.

6. The method of claim 5, wherein the step of optimizing the performance of the motor further comprises adjusting the theta ratio by adjusting one or both of the q-axis current (Iq) and the d-axis current (Id) vectors.

7. A method of operating a pumping system that includes an electric motor and a variable speed drive, the method comprising the steps of:
- setting a first preference for the operation of the motor;
- loading a first optimized motor model into the variable speed drive;
- controlling the motor in accordance with the first preference; and
- monitoring the performance of the motor by monitoring the theta ratio of the motor under a torque load.

8. The method of claim 7, further comprising a step of optimizing the performance of the motor by adjusting the theta ratio of the motor.

9. The method of claim 8, wherein the step of optimizing the performance of the motor further comprises adjusting the theta ratio by adjusting one or both of the q-axis current (Iq) and the d-axis current (Id) vectors.

10. The method of claim 9, wherein the step of optimizing the performance of the motor further comprises adjusting the theta ratio by increasing or decreasing the current load applied along the direct (d) axis of the motor to increase the efficiency of the motor.

11. The method of claim 9, wherein the step of optimizing the performance of the motor further comprises adjusting the theta ratio by increasing or decreasing the current load applied along the direct (d) axis of the motor to increase the power output of the motor.

12. The method of claim 7, further comprising the step of setting a second preference for the operation of the motor, wherein the second preference is different from the first preference.

13. The method of claim 12, further comprising the steps of:
- loading a second optimized motor model into the variable speed drive; and
- controlling the motor in accordance with the second preference.

14. The method of claim 7, wherein the step of controlling the motor in accordance with the first preference further comprises controlling the motor using a field oriented control scheme.

15. The method of claim 14, wherein the step of controlling the motor in accordance with the first preference further comprises controlling the motor using a vector control scheme.

16. An electric submersible pumping system comprising:
- a pump;
- a motor configured to drive the pump, wherein the motor is a permanent magnet motor; and
- a variable speed drive configure to control the operation of the motor, wherein the variable speed drive includes a field oriented control scheme, wherein the field oriented control scheme is a vector control scheme; and
- a motor control system implemented in connection with the variable speed drive, wherein the motor control system is configured to optimize the performance of the motor further by adjusting there the ratio of q-axis current (Iq) to d-axis current (Id).

17. The electric submersible pumping system of claim 16, wherein the motor control system is configured to increase the power output of the motor by adjusting the ratio of q-axis current (Iq) to d-axis current (Id).

18. The electric submersible pumping system of claim 16, wherein the motor control system is configured to increase the efficiency of the motor by adjusting the ratio of q-axis current (Iq) to d-axis current (Id).

* * * * *